(12) United States Patent
Welin

(10) Patent No.: US 9,863,489 B2
(45) Date of Patent: Jan. 9, 2018

(54) DISC BRAKE

(71) Applicant: Haldex Brake Products AB, Landskrona (SE)

(72) Inventor: Hans Welin, Sankt Ibb (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 14/782,231

(22) PCT Filed: Jan. 30, 2014

(86) PCT No.: PCT/EP2014/051758
§ 371 (c)(1),
(2) Date: Oct. 2, 2015

(87) PCT Pub. No.: WO2014/161679
PCT Pub. Date: Oct. 9, 2014

(65) Prior Publication Data
US 2016/0053836 A1  Feb. 25, 2016

(30) Foreign Application Priority Data

Apr. 2, 2013  (DE) .................... 20 2013 101 406 U

(51) Int. Cl.
*F16D 55/2265*  (2006.01)
*F16D 55/226*  (2006.01)

(52) U.S. Cl.
CPC ..... *F16D 55/2265* (2013.01); *F16D 55/2262* (2013.01)

(58) Field of Classification Search
CPC .......................... F16D 55/2265; F16D 55/2262

USPC ........... 188/72.3, 73.37, 73.38, 73.44, 73.45, 188/73.32
See application file for complete search history.

(56) References Cited

U.S. PATENT DOCUMENTS

| 3,368,647 | A | * | 2/1968 | Laverdant | ........... F16D 55/2262 |
| | | | | | 188/73.39 |
| 3,616,879 | A | * | 11/1971 | Pauwels | .............. F16D 55/2262 |
| | | | | | 188/73.33 |
| 3,893,546 | A | * | 7/1975 | Kestermeier | ....... F16D 55/2262 |
| | | | | | 188/73.34 |
| 3,942,611 | A | | 3/1976 | Burnett | |

(Continued)

FOREIGN PATENT DOCUMENTS

| DE | 3400544 A1 | 7/1984 |
| DE | 10248948 A1 | 5/2004 |

(Continued)

*Primary Examiner* — Thomas J Williams
*Assistant Examiner* — Mariano Sy
(74) *Attorney, Agent, or Firm* — St. Onge Steward Johnston and Reens LLC

(57) ABSTRACT

A disc brake including a brake caliper, which includes two lateral wings which tangentially encompass at least one brake disc, and which is displaceably guided on a brake carrier by two guiding elements, which are arranged opposite with respect to each other and radially with respect to the axis of the brake disc between the brake caliper and the brake carrier, in which a first guiding element in the area of one wing consists of a combination of a sliding bore and a guide pin being guided within it, and in which a second guiding element is configured within the opposite wing as a combination of at least two cooperating guiding surfaces.

20 Claims, 8 Drawing Sheets

(56) References Cited

U.S. PATENT DOCUMENTS

| | | | | |
|---|---|---|---|---|
| 4,034,858 A | * | 7/1977 | Rath | F16D 55/2265 |
| | | | | 188/71.8 |
| 4,072,215 A | * | 2/1978 | Burgdorf | F16D 55/226 |
| | | | | 188/72.4 |
| 4,136,761 A | * | 1/1979 | Burgdorf | F16D 55/2262 |
| | | | | 188/73.36 |
| 4,306,636 A | * | 12/1981 | Burgdorf | F16D 65/0972 |
| | | | | 188/73.43 |
| 4,382,493 A | * | 5/1983 | La Warre, Sr. | F16D 55/2262 |
| | | | | 188/73.35 |
| 4,533,025 A | | 8/1985 | Carre | |
| 4,588,051 A | * | 5/1986 | Mery | F16D 55/2265 |
| | | | | 188/250 B |
| 4,613,019 A | * | 9/1986 | Giorgetti | F16D 55/2265 |
| | | | | 188/73.31 |
| 4,630,713 A | * | 12/1986 | Carre | F16D 55/2265 |
| | | | | 188/73.39 |
| 4,817,764 A | * | 4/1989 | Stoka | F16D 55/2265 |
| | | | | 188/250 R |

FOREIGN PATENT DOCUMENTS

| | | |
|---|---|---|
| EP | 0117192 A1 | 8/1984 |
| EP | 1454076 A1 | 9/2004 |
| GB | 2120330 A | 11/1983 |

* cited by examiner

DISC BRAKE

FIELD OF THE INVENTION

The present invention refers to a disc brake, in particular for utility vehicles, having a sliding caliper or floating caliper which is axially slideably and displaceably arranged in relation to a caliper carrier being stationary in relation to a vehicle frame.

BACKGROUND OF THE INVENTION

For such disc brakes having a sliding caliper, which could comprise one or more brake discs in axially fixed or sliding arrangement, the caliper is guided in relation to a caliper or brake carrier in a sliding manner, in which the caliper carrier, for example, will be fixed to an axle body or to a similar section of the vehicle underframe being stationary in relation to that axle body. Alternatively, it is also possible that the brake caliper is arranged in relation to a carrier section in a sliding manner, which is integral with the axle body or with surrounding stationary sections of the vehicle frame.

A typical brake caliper of the sliding type, as it is often used in the field of disc brakes for utility vehicles, comprises a substantially frame-like shape with a housing section, which serves for receiving a brake actuation mechanism, a bridge section being opposite to that housing section and two wing or arm sections, which connect the housing section and the bridge section, in which thereby usually at least one brake disc is encompassed by both wing sections and the bridge section. In the area of the housing section an inner brake pad having an inner brake pad holder is provided, opposite to which at the other side of the at least one brake disc an outer brake pad with a corresponding brake pad holder is arranged, so that during brake actuation both the inner brake pad and at the same time the outer brake pad due to a closed force flow and the thereby induced sliding motion of the brake caliper opposite to the direction of the actuating force of the brake actuation mechanism come into attachment with the brake disc.

Such sliding caliper with all its sections as a whole can be made of one piece or of several caliper components being bolted together, for example with a bridge section being fixed to the face surfaces of the wings by means of correspondingly dimensioned screw bolts.

For the purpose of guiding the brake caliper on the caliper carrier different mechanisms and techniques are known in the prior art.

One common arrangement includes guiding elements in the form of slide pins or guiding bolts, which are axially guided in corresponding slide bearings, so that the brake caliper can be displaced in relation to the stationary caliper carrier. In order to enable a perfect displaceable support of the brake caliper in relation to the carrier for that usually at least two slide bearings are required, in which one of the slide bearings is configured as a fixed bearing, which is being configured to almost take up the entire forces which appear during the sliding motion. At least one further slide bearing, which counteracts any rotation of the brake caliper around the first slide bearing, is configured as a floating bearing in order to also provide a dampening effect and a compensation of manufacturing tolerances. Such arrangements, for example, are known from GB 2120330 A and DE 10248948 B4.

Moreover, from U.S. Pat. No. 3,942,611 it is already known to use one single slide pin for guidance, by means of which the brake caliper is fixed to a carrier in a sliding manner. In order to prevent rotation of the brake caliper, furthermore, a tongue or protrusion has been provided at the brake caliper, which engages with a corresponding bore or recess of the carrier. A mechanism with one single slide pin is also disclosed by EP 1454076 B1, in which the brake caliper furthermore is radially guided to both sides of the brake disc in relation to the carrier by means of guiding shoulders being set under pretension. For that leaf spring-like elements are provided between the guiding shoulders of the brake carrier and the corresponding abutment sections of the brake caliper, which counteract any noise generation and rattling.

For example, from DE 3400544 C2 it is known to arrange one single guide pin in close proximity to the rotation axis of the brake disc, by means of which the brake caliper is guided in relation to a relatively small brake carrier which is substantially provided within the projection surface of the brake disc. In order to prevent a rotation of the brake caliper during a brake actuation due to the rotational motion of the brake disc, for this embodiment two flat sliding shoulders are provided at the carrier at positions being radially opposite to each other in relation to the guide pin, at which sliding shoulders the brake caliper comes into attachment with corresponding sliding surfaces.

However, also guiding mechanisms between a brake caliper and brake carrier are known which do not require any guide pins at all. For example, U.S. Pat. No. 4,136,761 discloses a mechanism, in which the brake caliper is guided by means of four equally arranged V-shaped guiding recesses in the carrier.

SUMMARY OF THE INVENTION

It is the objective of the present invention to further develop the sliding guidance of the brake caliper in relation to the brake carrier in such a way that the manufacturing and assembly costs can be further reduced, in particular in view of the fact that the use of several guiding surfaces and guide pins, respectively, and perhaps of bearing elements cooperating therewith for avoiding the generation of noise and rattling loads as well as for the compensation of manufacturing tolerances proves to be extremely cost-intensive.

This objective is solved by a disc brake comprising a brake caliper, which comprises two lateral wings, which tangentially encompass at least one brake disc, and which is displaceably guided on a brake carrier by means of two guiding elements, which are arranged opposite with respect to each other and radially with respect to the axis of the brake disc between the brake caliper and the brake carrier, in which a first guiding element in the area of one wing consists of a combination of a sliding bore and a guide pin being guided within it, and in which a second guiding element is configured within the opposite wing as a combination of at least two cooperating guiding surfaces Accordingly, the invention refers to a disc brake having a brake caliper, which comprises two lateral wings, which tangentially surround at least one brake disc, and which is displaceably guided on a brake carrier by means of two guide elements, which are arranged between the brake caliper and the brake carrier opposite to each other and radially with respect to the axis of the brake disc.

A first guide element is arranged in the area of a wing, i.e. at least in its close proximity, and is configured as a combination of a sliding bore and a guide pin being guided within it, whereas the second guide element is realized within the opposite wing as a combination of at least two guiding surfaces cooperating with each other. Within the wing in that sense could mean that the guide element is provided either as an integral component or as a separate component, being spatially integral with the wing or at least proximate at the free external ends or edges of the wing.

For that the sliding bore for the first guide element can be either provided in the brake caliper or in the brake carrier and the guide pin being guided within it then can be provided in a corresponding way at the brake carrier or the brake caliper, respectively. Preferably, the guide pin is arranged at the side of the housing section in axial direction with respect to the brake disc.

The second guide element prevents a rotational movement around the single guide pin, in that it provides a sliding support in the other wing, namely in relation to the center of the disc brake or centerline of it, which e.g. can be seen to be coaxial with respect to the rotational axis of the brake disc, and tangentially to the other side. By that it is ensured that a rotational movement around the guide pin on the one hand and moreover the risk of contact with the wheel rim or with hub components on the other will be avoided and an axial sliding motion of the brake caliper with respect to the brake carrier is enabled.

According to the invention the second guide element is preferably arranged in axial direction substantially close to the center of the corresponding wing. Moreover, the second guide element can be arranged radially above the brake disc, i.e. in the area of the outer edge of the brake disc.

Such arrangements and positions of the second guide element have the advantage that machining measures for the sliding surfaces will have only a minimum influence on the strength of the wing, since the areas which are exposed to high mechanical tensions during a brake actuation, namely the corresponding ends of the wings both at the housing section and at the bridge section of the brake caliper, escape the machining works.

According to the invention, the first guide element and/or the second guide element can be arranged radially outside of the braking surface, i.e. the projected axial face surface of the brake disc.

According to one embodiment the second guide element is configured in such a way that the brake carrier comprises at least one guiding section having at least one guiding surface, which is guided at at least one corresponding guiding surface of the corresponding wing.

In principle, the number of guiding surfaces is not restricted. Several, preferably pairs of guiding surfaces both at the brake caliper and at the brake carrier can be provided, which in turn can be orientated with respect to each other in a defined angle or be spaced apart with respect to each other.

Therefore, in one embodiment it could be provided that the brake carrier comprises two guiding sections being separated from each other and having guiding surfaces, which are guided at guiding surfaces being arranged at the edges of the wings. In other words, the guiding surfaces are provided at the radially free upper and lower edges of the wings, preferably in the center when seen in axial direction.

For that the guiding section of the brake carrier can comprise a guiding surface which attaches to an edge of the wing, whereas the guiding section comprises a further guiding surface being opposite to that guiding surface, at which the brake pad holder, preferably of the inner brake pad being provided at the housing section, is guided.

According to another embodiment of the invention the wing comprises a recess in which a guiding section of the brake carrier is guided in a sliding manner. Both the shape of the recess and the design of the guiding section of the brake carrier could be selected as desired.

Basically it is preferred that the guiding surfaces, irrespective of the single embodiments, are configured integrally with the brake carrier and the brake caliper, respectively. Depending on the embodiment, however, it is alternatively also possible that the guiding surfaces with the corresponding guiding sections of the brake carrier and the brake caliper, respectively, will be fixed as separate components, preferably in a releasable way, for example, by means of screws, at the corresponding components of the disc brake.

In order to realize corresponding sliding characteristics with at the same time providing the strength required in the field of disc brakes, the sliding surfaces of the guiding surfaces, which ideally will be manufactured by machining afterwards or already during casting or forging of the brake caliper and the brake carrier, respectively, will be hardened by a corresponding surface treatment.

According to a peculiar embodiment of the invention the corresponding sliding surfaces will be provided with a corresponding friction-reducing and wear-resistant coating, which, for example, will be applied by way of spraying, welding, gluing or soldering treatments and techniques.

In order to prevent jamming or too large friction forces, which can be caused in use in the field of disc brakes by the appearance of dirt and corrosion connected therewith, basically the distances and the play, respectively, between the guiding surfaces of the brake caliper on the one hand and the guiding surfaces of the brake carrier on the other hand have to be selected to be substantially large. In turn, this has the disadvantage that rattling noises by vibrations could occur or that the guiding surfaces could be damaged by hammering due to vibrations.

In order to prevent such undesired effects it is suggested by the invention to provide at least one spring element between the guiding surfaces of the brake caliper and the guiding surfaces of the brake carrier, which leaf spring counteracts any rattling load and suppresses any noise generation. A further advantage for the use of spring elements between the corresponding guiding surfaces can be seen in that the guiding surfaces will be not damaged by the rattling and in this context an increased wear can be avoided. Preferably, these spring elements are configured as constructions of leaf springs.

In the embodiment having the recess in the wing of the brake caliper the spring element preferably extends axially over the length of the recess. More preferably, the spring element is designed and configured in such a way that it is displaceably guided within the recess in axial direction, in order to not put any unnecessary resistance against the sliding process of the guiding section of the brake carrier.

According to a more preferred embodiment of the invention the spring element is configured such that it can be axially compressed during a brake actuation due to the displacement of the brake caliper in the recess and that thereby a return force is generated which after termination of the brake actuation additionally supports the return movement via its effect onto the corresponding guiding section of the brake carrier, however, at least enables a correspondingly exact guidance of the guiding section in the recess during the return movement, which prevents jamming.

Since according to the invention only guiding surfaces cooperating with each other are provided instead of a second guide pin with a corresponding guide bore, the manufacturing and assembly costs due to the lower requirements with respect to tolerances on the one hand and due to a better accessibility for the purpose of machining of the guiding surfaces on the other hand as compared to a bore will be reduced significantly. An additional advantage is that the disc brake enjoys a further weight reduction since an additional guide pin, which usually is made with a corresponding strength and hardness and increased weight associated therewith, as well as the further bearing elements cooperating therewith will not be required anymore.

BRIEF DESCRIPTION OF THE DRAWINGS

Further features and advantages of the present invention will become apparent from the embodiments as described in connection with the enclosed drawings, in which.

DETAILED DESCRIPTION OF THE INVENTION

A brake caliper 1 being made of one piece and having a housing section 1.1 for receiving a brake actuation mechanism and a bridge section 1.2 being opposite to said housing section 1.1, which at both sides are connected by wings 1.3 and 1.4 which tangentially surround a brake disc not shown, is displaceably guided on a brake carrier 2 being stationary in relation to the vehicle frame.

Figure 3:
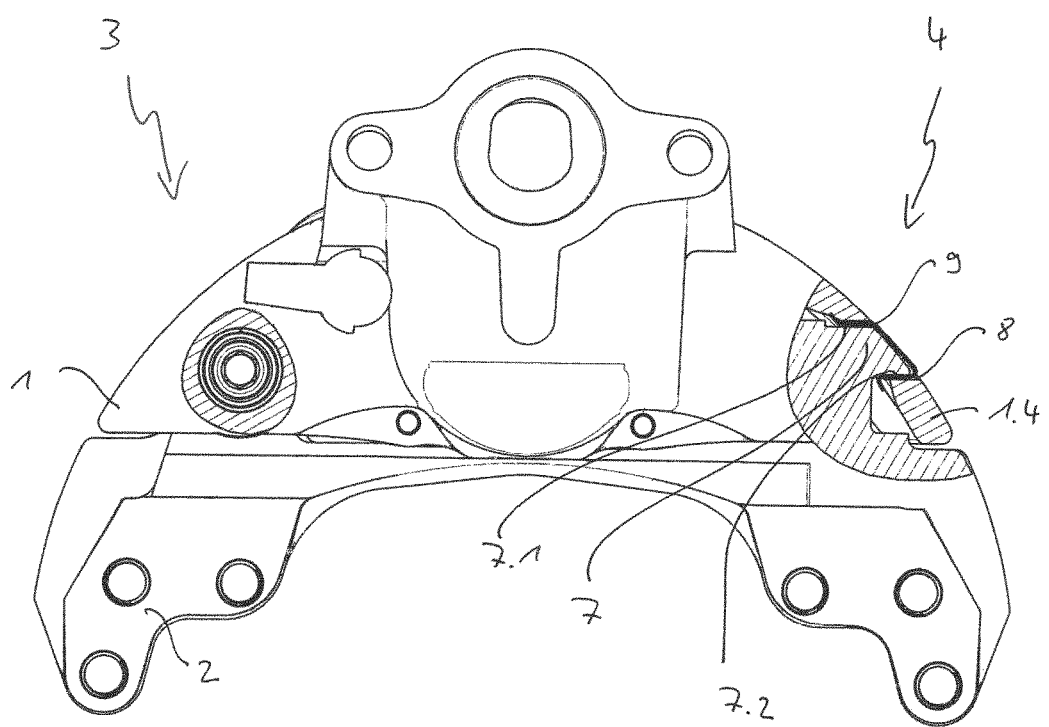
FIG. 3 shows the first embodiment according to the invention from the rear in partial sections.

For that purpose the disc brake comprises two guiding elements which are spaced apart radially with respect to the center of it and with respect to the rotational axis of the brake disc, respectively, namely a guiding element 3 in the area of the first wing 1.3 and a second guiding element 4 in the area of the second wing 1.4, as can be seen from FIG. 3.

The first guiding element 3 consists of a combination of a guide pin 5, which is screwed into the carrier 2 and which is guided in a corresponding sliding bore 6 of the brake caliper 1, perhaps by using corresponding bearing elements, in a sliding manner.

Figure 1:
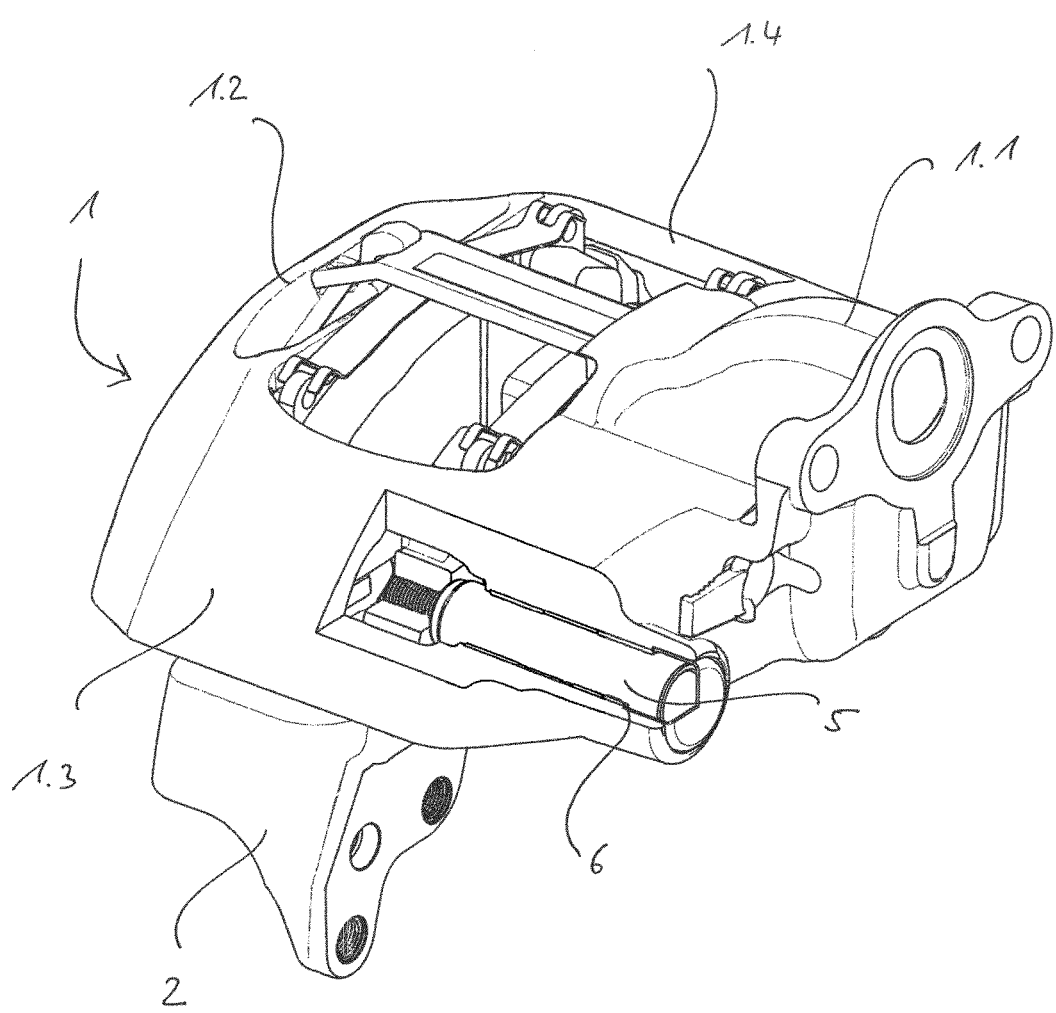
FIG. 1 shows a first embodiment of the disc brake according to the invention in perspective view from one side.
Figure 2:
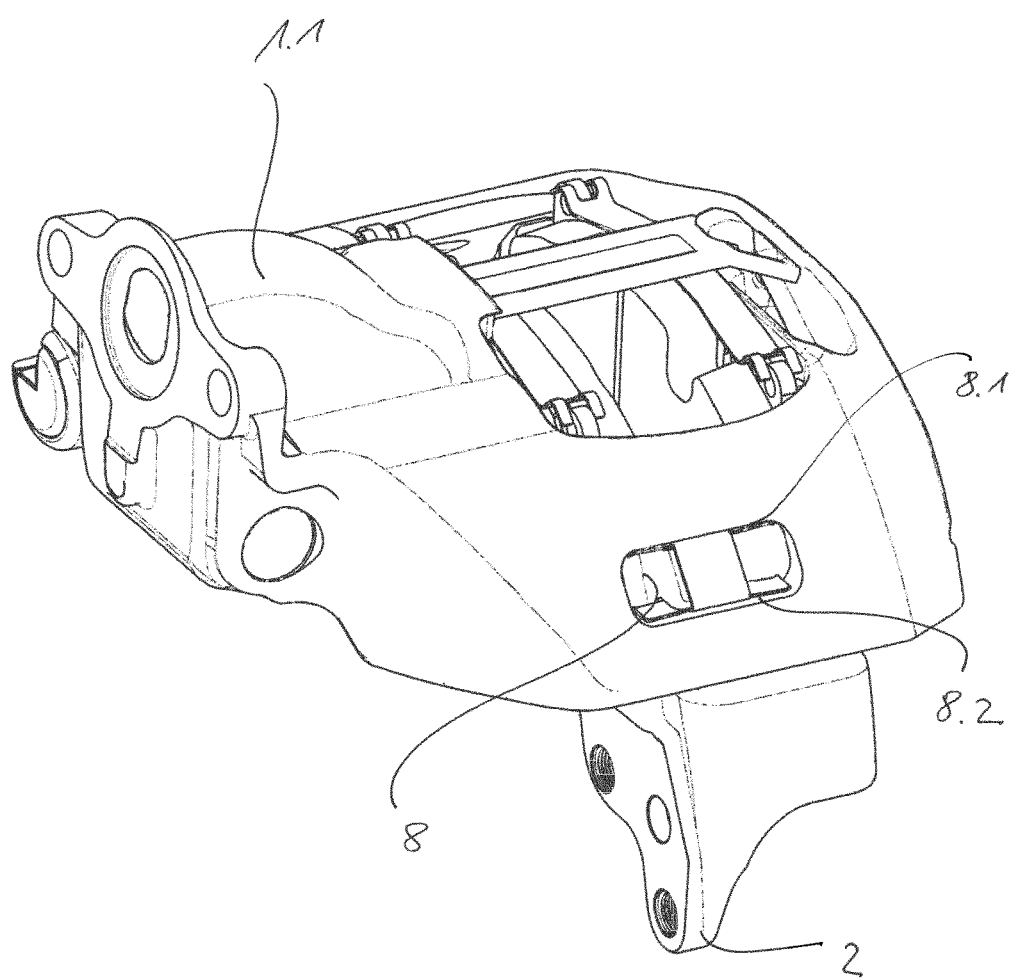
FIG. 2 shows the first embodiment according to the invention in perspective view from the other side.
Figure 4:
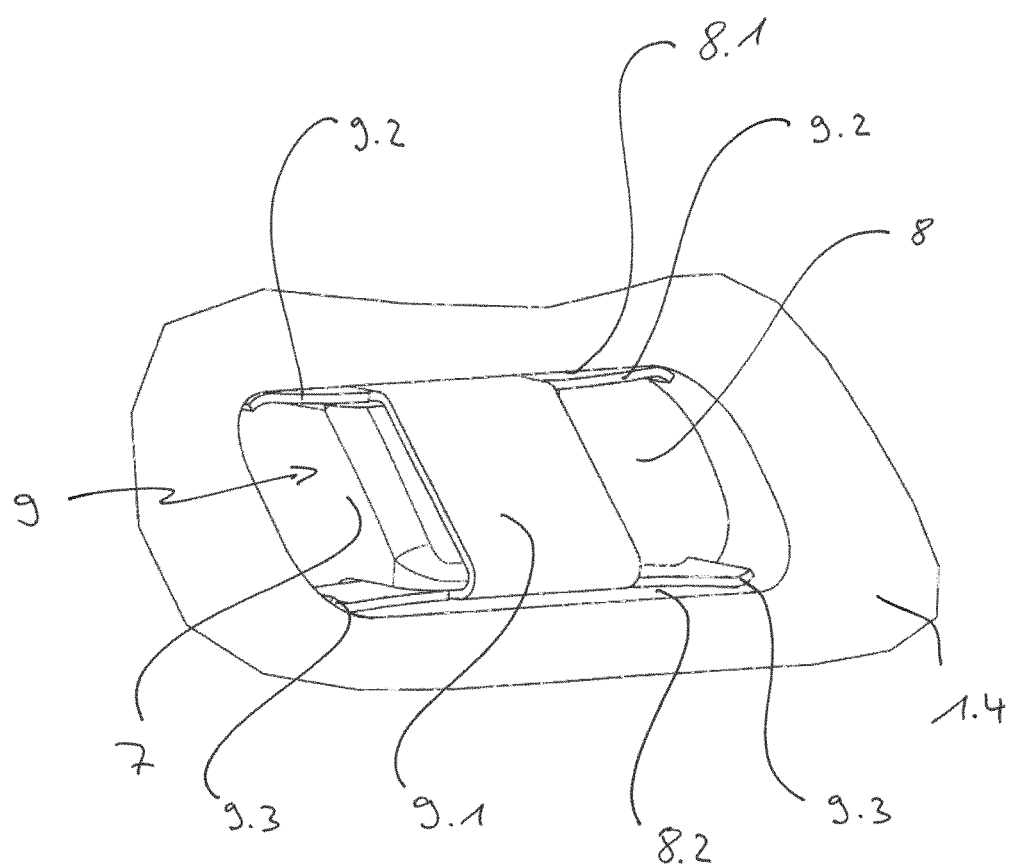
FIG. 4 shows an enlarged partial view of the recess in one wing of the brake caliper according to the first embodiment of the invention.

As can be seen from FIGS. 2 to 4, according to the invention the second guiding element 4 is provided within the second wing 1.4.

According to the embodiment as shown in these FIGS. 2 to 4 this guiding element 4 is made by a guiding section 7 of the brake carrier 2, which engages with a corresponding recess 8 in wing 1.4 in a sliding manner.

The guiding section 7 is realized in the form of a nose-like protrusion, which comprises two guiding surfaces 7.1 and 7.2, which are running in parallel and are spaced apart with respect to each other and which are guided at corresponding guiding surfaces 8.1 and 8.2 of the recess 8 by interposition of a leaf shaped spring element 9 in a sliding manner.

As FIG. 4 shows, the spring element 9 with an external section 9.1 radially at the outside encompasses the surface of the guiding section 7, in which sections 9.2 do extend from section 9.1 in axial direction over the axial length of the recess 8. The free ends 9.3 of the sections 9.2 are slightly curved and do substantially attach at corresponding curvatures of the ends of the recess 8 in a congruent manner.

Upon displacement of the brake caliper 1 in relation to the carrier 2 during a brake actuation these free ends 9.3 can move along the curvature of the recess 8 towards each other and by that can set the spring element 9 in this area slightly under tension, which results in the generation of a return force which, after termination of the brake actuation, is able to slightly support the return movement of the brake caliper 1 in relation to the guiding section 7 of the brake carrier 2.

Figure 5:
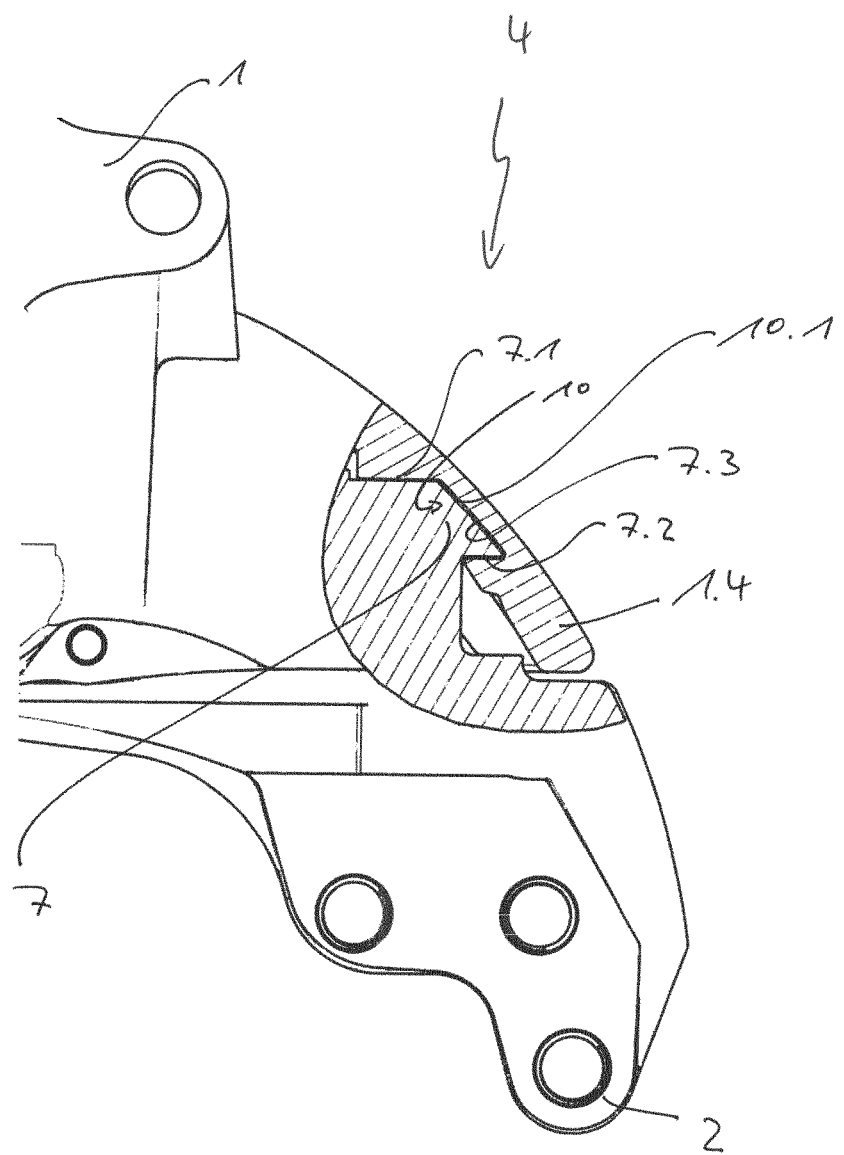
FIG. 5 shows a second embodiment according to the invention in partial sectional view.

In FIG. 5 a second embodiment according to the invention is shown.

In this the recess 10 for receiving the guiding section 7 is not open, but at the inside being integral with the wing 1.4. Therefore, the guiding section 7 of the brake carrier 2 is made shorter and comprises a further guiding surface 7.3, which cooperates with a corresponding guiding surface 10.1 of the recess 8.

As in particular FIG. 2 shows, the guiding section 7 and the recess 8, when seen in axial direction, are substantially provided in the area being radial above the brake disc and almost in the center of the wing 1.4. This shall also apply for the embodiment according to FIG. 5.

Figure 6:
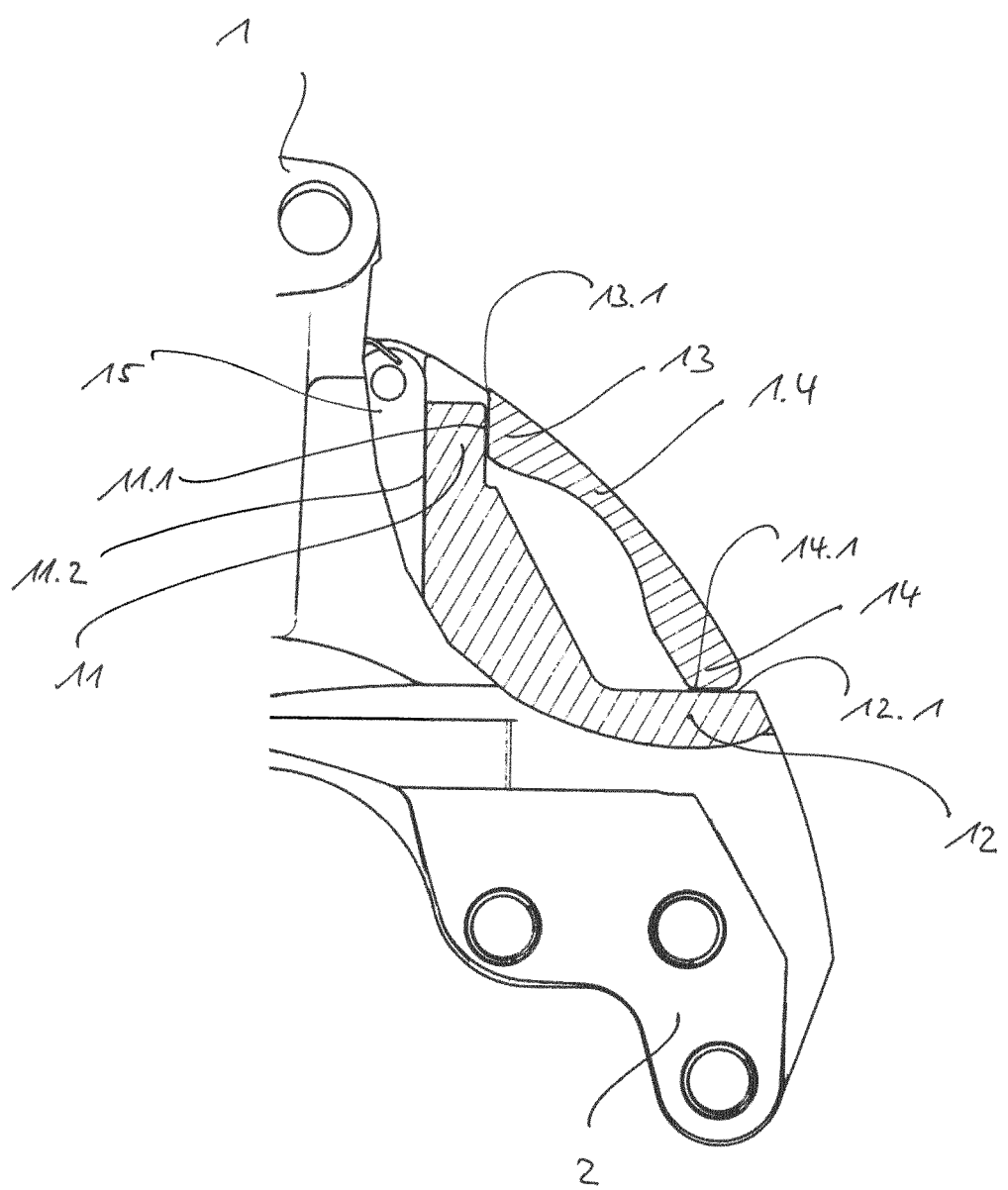
FIG. 6 shows a third embodiment according to the invention in partial sectional view.
Figure 7:
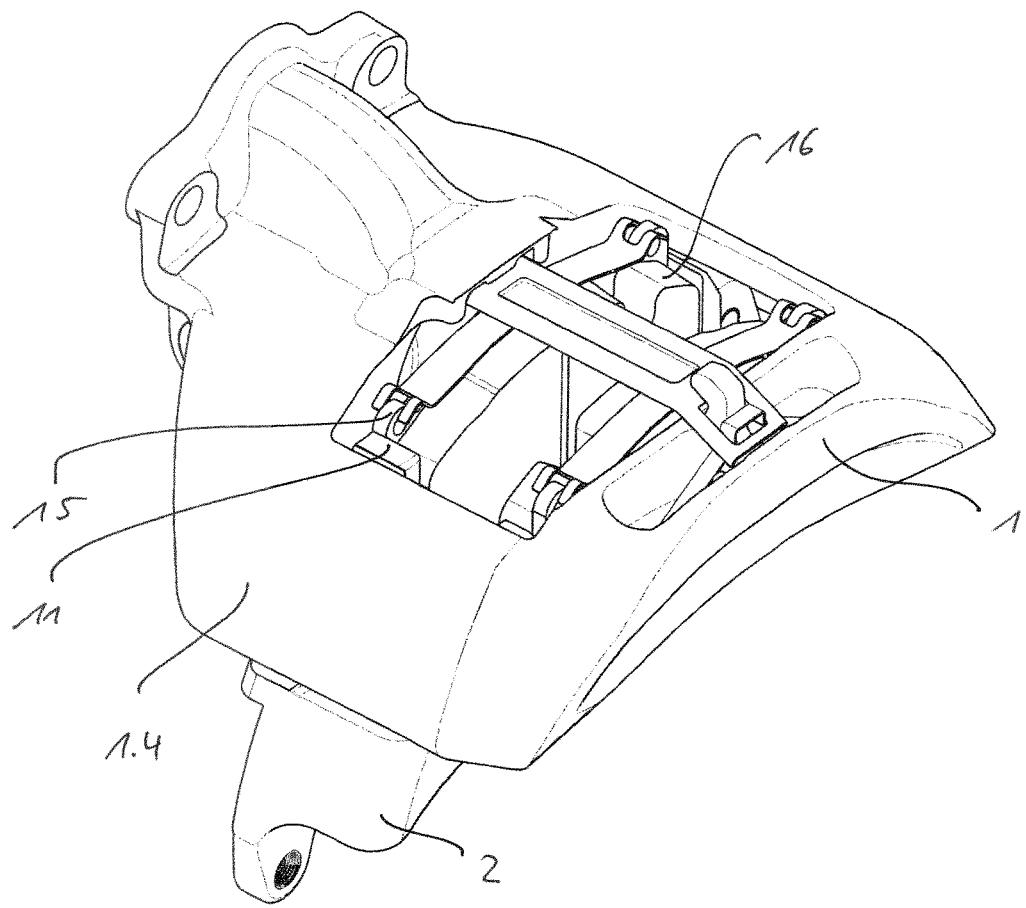
FIG. 7 shows the brake caliper according to the third embodiment in a perspective view.

In FIG. 6 a third embodiment according to the invention is shown.

In this, the brake carrier 2 comprises two guiding sections 11 and 12, which each comprise a guiding surface 11.1 and 12.1, respectively.

The guiding sections 11 and 12 are orientated with respect to each other substantially in a right angle and are arranged in such a way that these, at the outside, do attach to the radially free edges 13 and 14 of the wing 1.4, and in particular at their guiding surfaces 13.1 and 14.1, respectively.

The guiding section 11 is made as a vertical web, so that, beside the guiding surface 11.1 for the guidance of the brake caliper 1 at the carrier 2, it comprises a further guiding surface 11.2, at which the brake pad holder 15 of the brake pad 16 being provided at the inside at the housing section 1.1 of the brake caliper 1 is guided.

Figure 8:
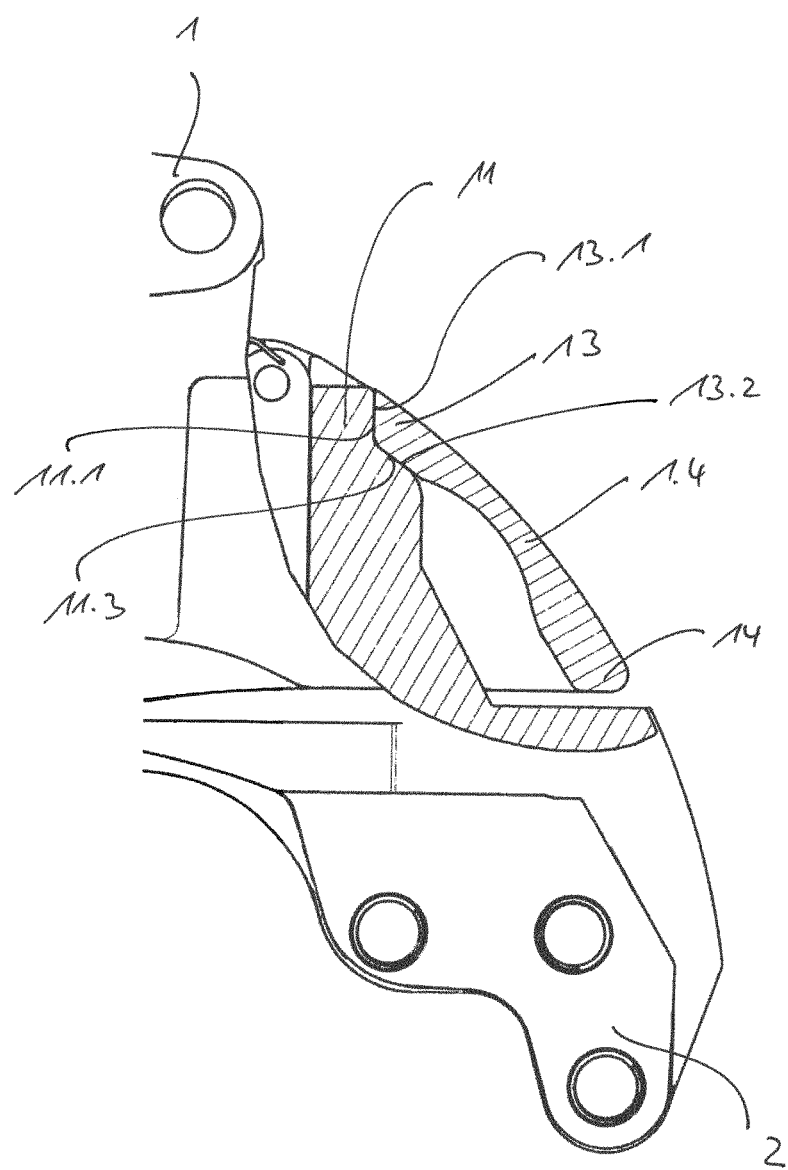
FIG. 8 shows a fourth embodiment according to the invention in a partial sectional view.

In FIG. 8 a fourth embodiment according to the invention is shown which is an alternative to the embodiment according to FIG. 6.

For that the wing 1.4 at the inside comprises a further guiding surface 13.2 in the area of its upper edge 13, which is inclined with respect to the first guiding surface 13.1. In a corresponding way a further guiding surface 11.3 is provided at the web 11. In the area of the lower edge 14 of the wing 1.4 there is no guidance between the brake caliper 1 and the brake carrier 2.

The invention claimed is:

1. A disc brake including a brake caliper, said brake caliper comprising:
   first and second lateral wings tangentially encompassing at least one brake disc, said brake caliper being displaceably guided on a brake carrier by means of two guiding elements that are arranged opposite with respect to each other and radially with respect to an axis of the at least one brake disc between the brake caliper and the brake carrier,
   a first guiding element in an area of the first lateral wing, the first guiding element including a sliding bore and a guide pin being guided within the sliding bore, and a second guiding element is configured within the second lateral wing, the second guiding element including at least two cooperating guiding surfaces at least one of said guiding surfaces being integral with the second lateral wing or made as a separate component to be fixed to the second lateral wing, said brake carrier comprises at least one guiding section having at least one guiding surface, which is guided by at least one corresponding guiding surface of the second lateral wing, thereby forming a second guiding element.

2. The disc brake according to claim 1, in which the second guiding element in axial direction is arranged substantially in proximity to a center of the second lateral wing.

3. The disc brake according to claim 2, in which the second guiding element is arranged radially above the at least one brake disc.

4. The disc brake according to claim 1, in which the guiding elements are arranged radially and externally of a braking surface of the at least one brake disc.

5. The disc brake according to claim 1, in which the brake carrier comprises two guiding sections having guiding surfaces, which are guided at guiding surfaces being arranged on the edges of the second lateral wing.

6. The disc brake according to claim 5, in which a guiding section of the brake carrier comprises a guiding surface and opposite thereto a guiding surface for guidance of a brake pad holder.

7. The disc brake according to claim 1, in which the second lateral wing comprises a recess, in which a guiding section of the brake carrier is guided in a sliding manner.

8. The disc brake according to claim 7, in which at least one spring element is arranged between the guiding surfaces of the brake carrier and of the second lateral wing, which spring element extends axially over the length of the recess.

9. The disc brake according to claim 8, in which the spring element is guided in the recess in a displaceable manner.

10. The disc brake according to claim 1, in which at least one spring element is arranged between the guiding surfaces of the brake carrier and the second lateral wing.

11. The disc brake according to claim 10, in which the spring element can be compressed thereby generating a return force.

12. The disc brake according to claim 1, in which the guiding surfaces of the brake carrier and/or of the wings are provided with a friction-reducing and/or wear-resistant coating.

13. A disc brake having a brake caliper, said brake caliper comprising:
   a first lateral wing,
   a second lateral wing,
   at least one brake disc, wherein said first and second lateral wings tangentially encompass said at least one brake disc,
   wherein said brake caliper is displaceably guided on a brake carrier by means of two guiding elements that are arranged opposite with respect to each other and radially with respect to an axis of said at least one brake disc between the brake caliper and the brake carrier,
   a first guiding element positioned in adjacent to the first lateral wing, said first guiding element having a sliding bore and a guide pin that is guided within the sliding bore, and
   at least one guiding section having at least one guiding surface that is guided by at least one corresponding guiding surface of said second lateral wing, thereby forming a second guiding element, wherein at least one of said guiding surfaces being integral with said second lateral wing or made as a separate component to be fixed to said second lateral wing.

14. The disc brake according to claim 13, in which the second guiding element in axial direction is arranged substantially in proximity to a center of the second lateral wing.

15. The disc brake according to claim 14, in which the second guiding element is arranged radially above the at least one brake disc.

16. The disc brake according to claim 13, in which the guiding elements are arranged radially and externally of a braking surface of the at least one brake disc.

17. The disc brake according to claim 13, in which the brake carrier comprises two guiding sections having guiding surfaces, which are guided at guiding surfaces being arranged on the edges of the second lateral wing.

18. The disc brake according to claim 17, in which a guiding section of the brake carrier comprises a guiding surface and opposite thereto a guiding surface for guidance of a brake pad holder.

19. The disc brake according to claim 13, in which at least one spring element is arranged between the guiding surfaces of the brake carrier and the second lateral wing.

20. The disc brake according to claim 13, in which the guiding surfaces of the brake carrier and/or of the wings are provided with a friction-reducing and/or wear-resistant coating.

* * * * *